July 14, 1964  S. G. A. BERGMAN ETAL  3,140,648
ANTI-BLAST VALVE
Filed Jan. 31, 1962  8 Sheets-Sheet 1
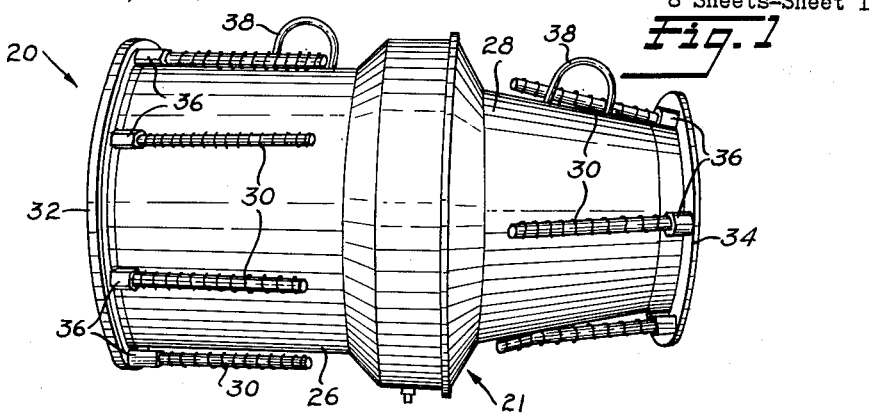
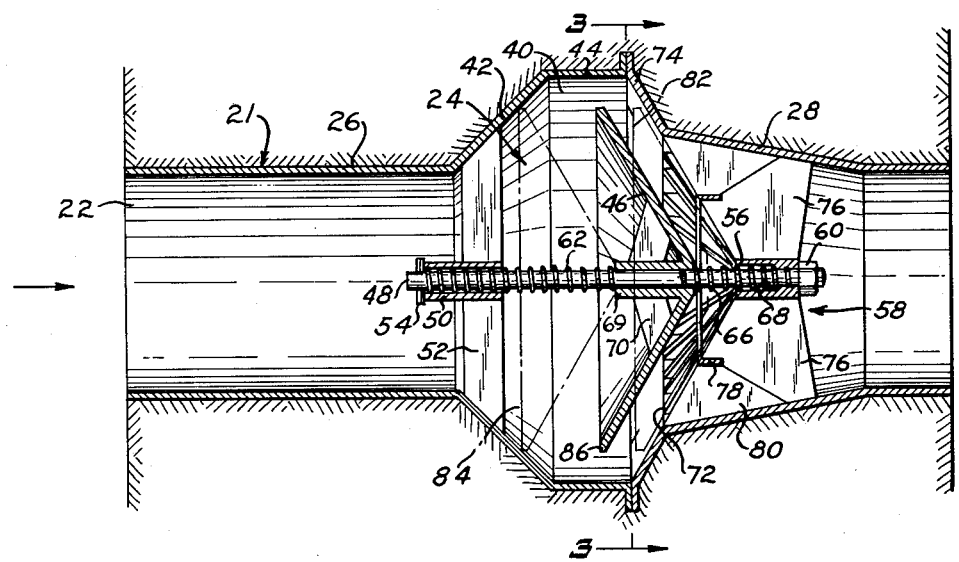
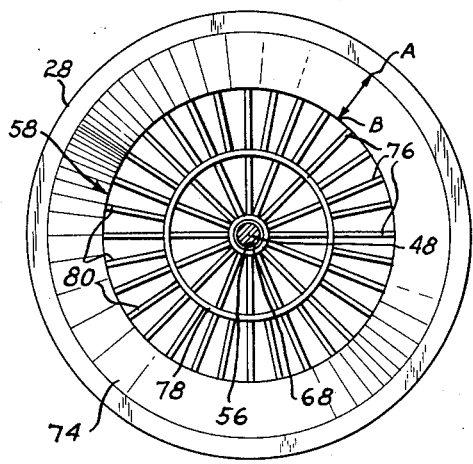
INVENTORS
STEN GOSTA ARIEL BERGMAN
JOHN BERTIL STALFORS
BY *Strauch, Nolan & Neale*
ATTORNEYS

INVENTORS
STEN GOSTA ARIEL BERGMAN
JOHN BERTIL STALFORS

BY Strauch, Nolan & Neale

ATTORNEYS

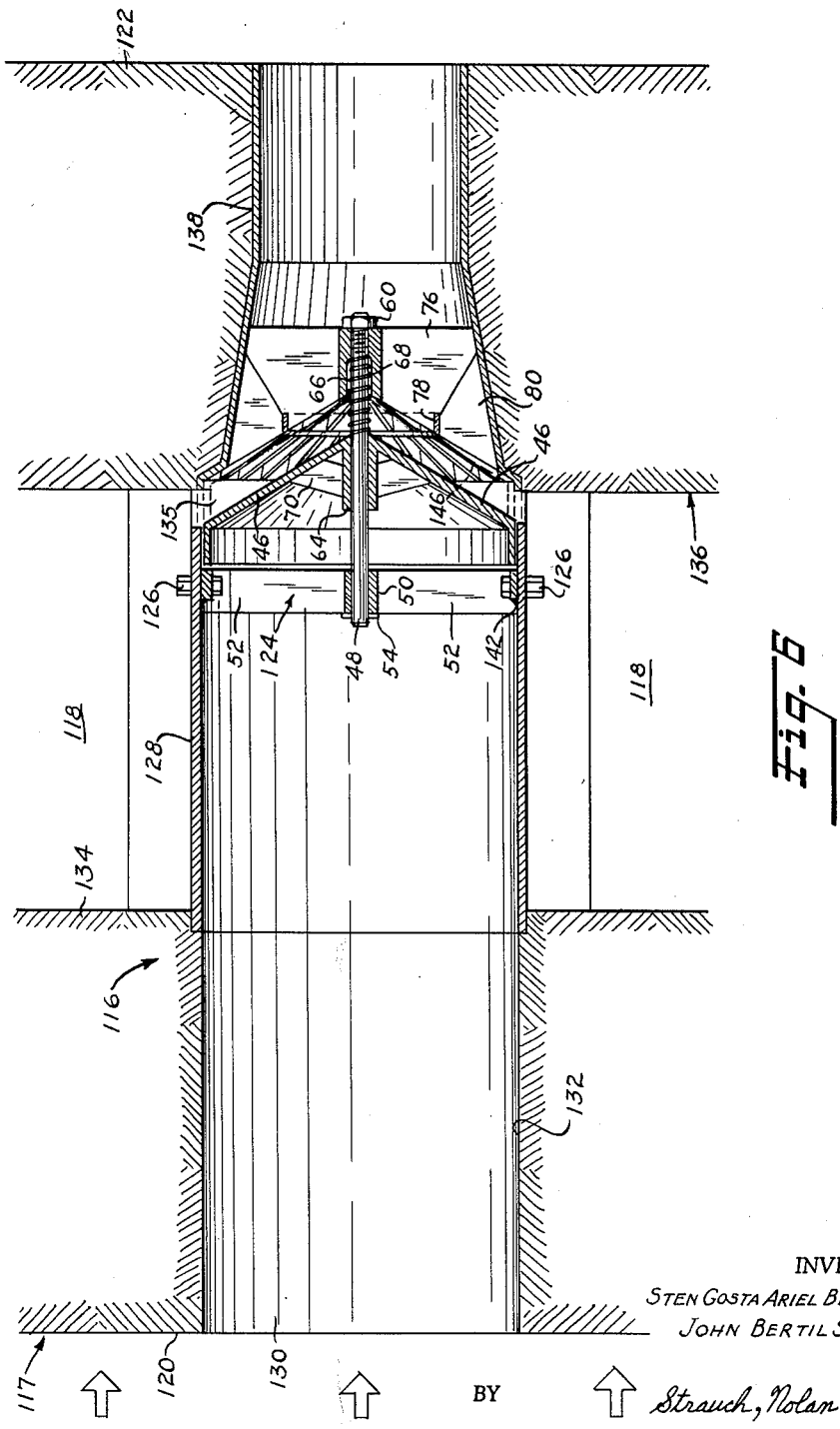

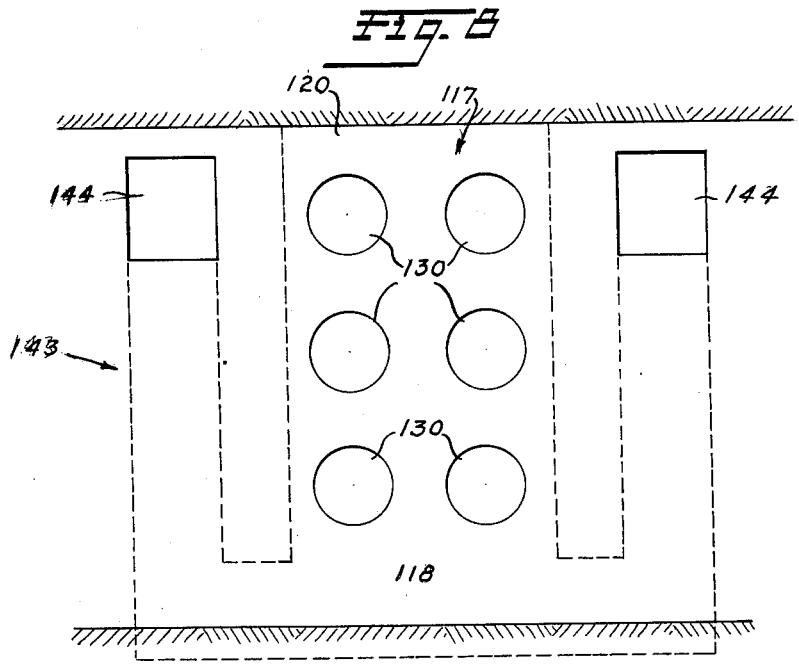
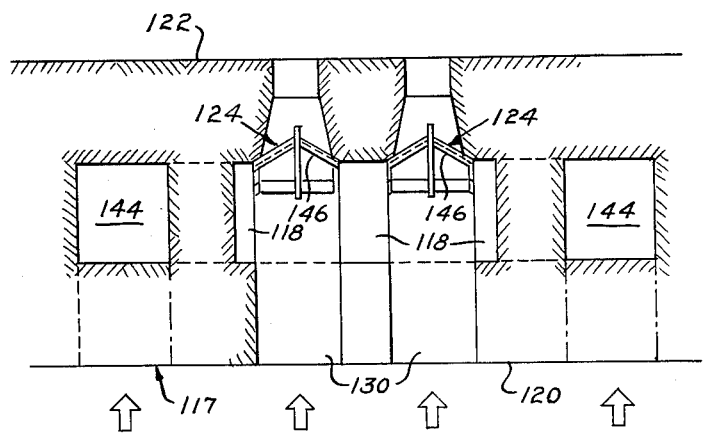

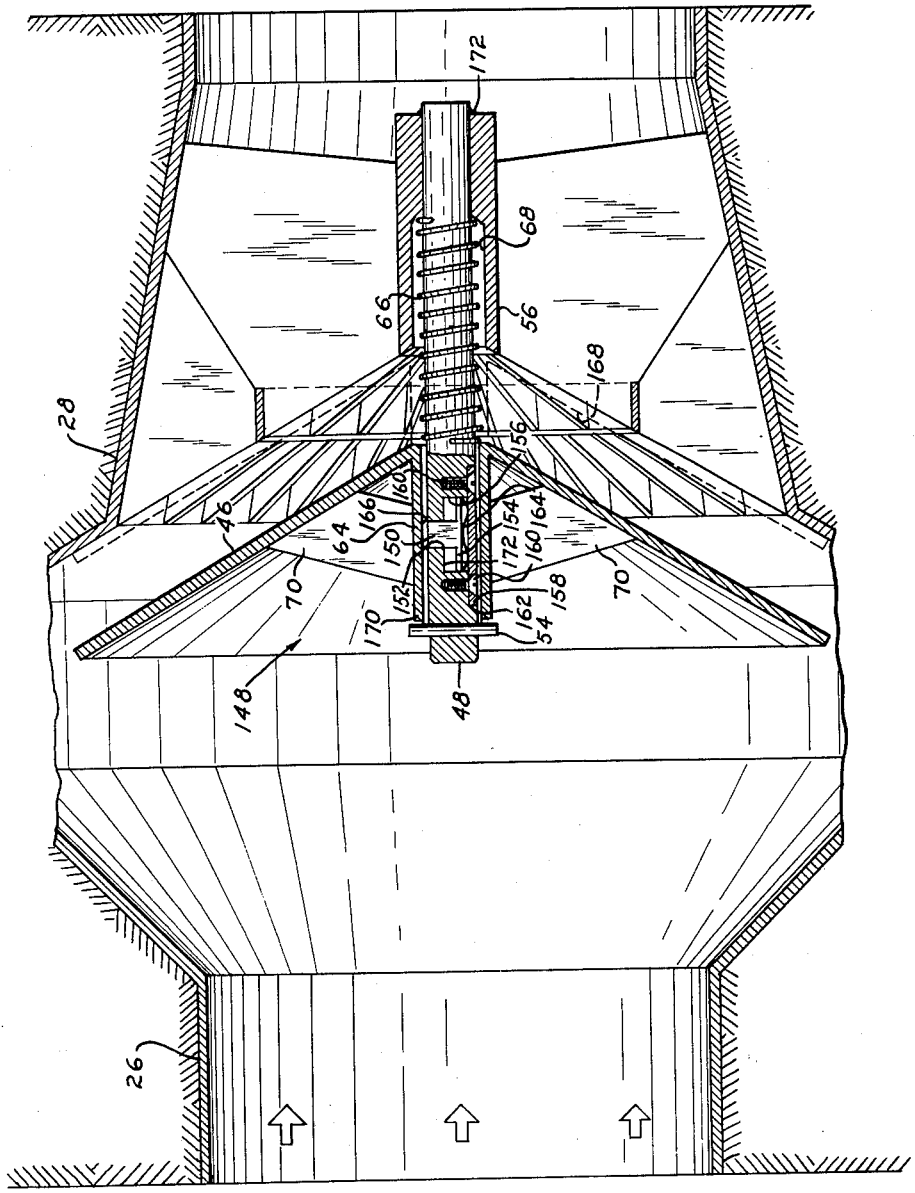

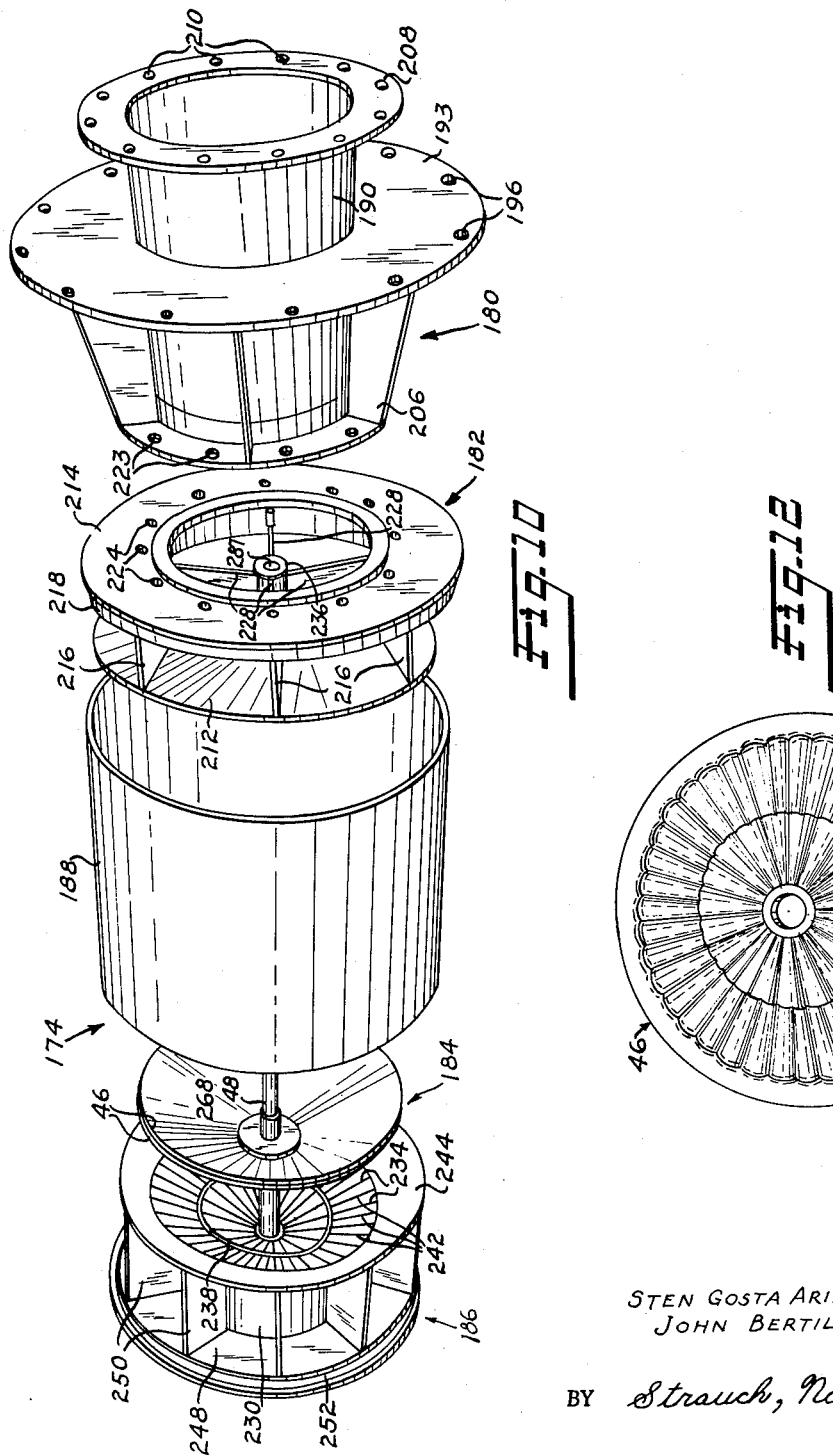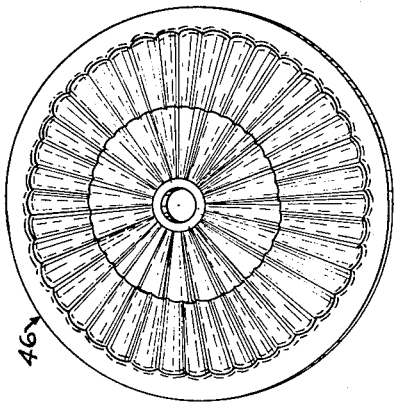

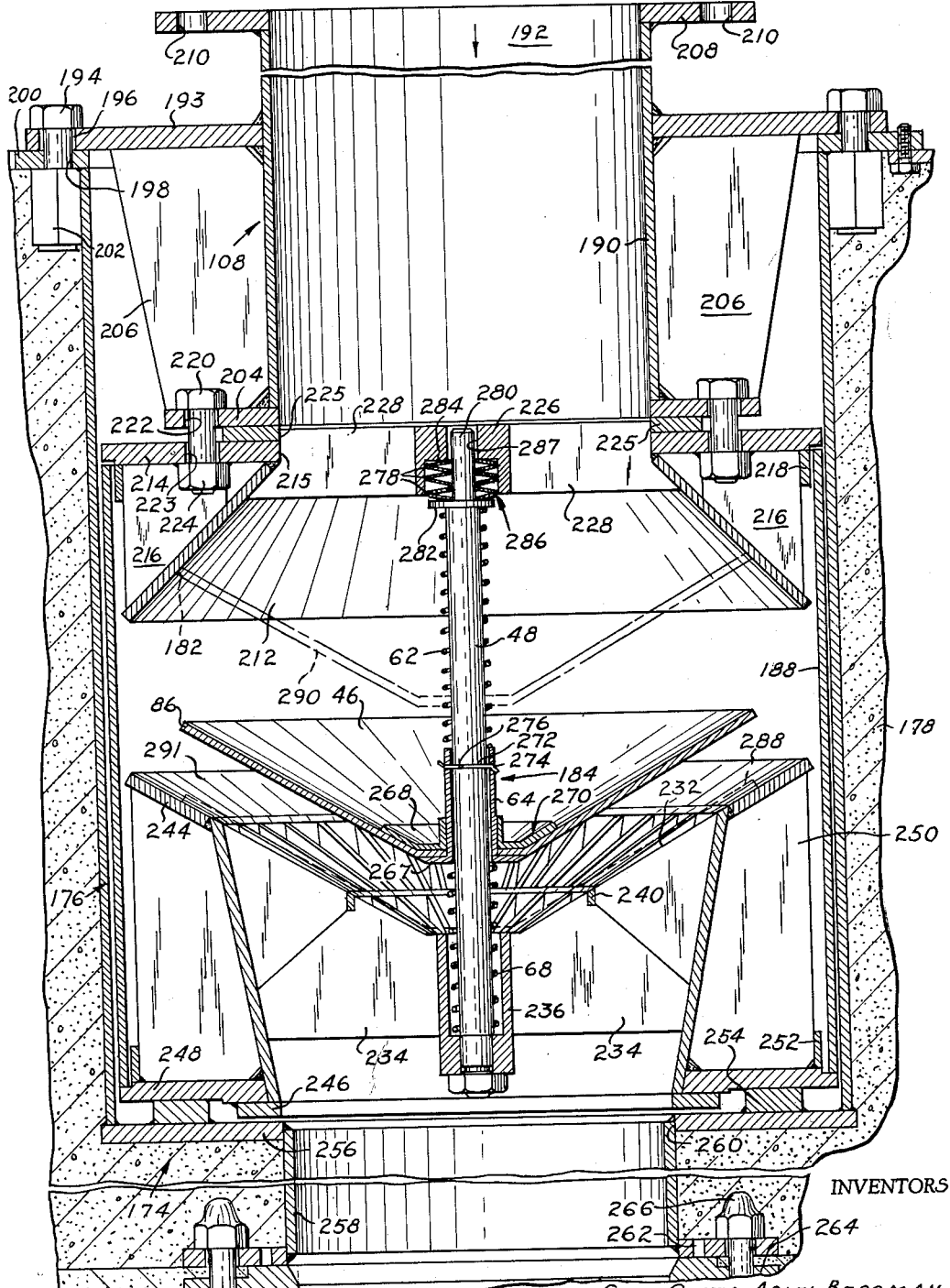

INVENTORS
STEN GOSTA ARIEL BERGMAN
JOHN BERTIL STALFORS

BY *Strauch, Nolan & Neale*

ATTORNEYS

United States Patent Office 3,140,648
Patented July 14, 1964

3,140,648
ANTI-BLAST VALVE
Sten Gosta Ariel Bergman, Foreningsvagen 19, Stocksund, Sweden, and John Bertil Stalfors, Gullmarsvagen 48, Johanneshov, Sweden
Filed Jan. 31, 1962, Ser. No. 170,060
Claims priority, application Sweden Mar. 4, 1959
21 Claims. (Cl. 98—119)

This invention relates to valves and more specifically, to rapid closing anti-blast valves for insulating air-raid shelters, underground plants, and similar structures from the destructive blast effects of atomic and thermonuclear explosions. The present application is a continuation-in-part of application No. 9,385 filed February 17, 1960.

Air-raid shelters, underground plants, and similar structures that have to be protected against the destructive effect of strong air shock waves such as those produced by the detonation of nuclear weapons may only very seldom be constructed in such a way that they are hermetically closed during the periods of time when protection is required. In most cases it is necessary to provide them with ventilating ducts and flue ducts which have to communicate directly and continuously with the atmosphere to supply fresh air to and remove noxious gases from the structure so that necessary activities may be carried on within the structure and so that dangerous concentrations of gases which would endanger persons within the structure will not accumulate therein. As one does not know when a dangerous air shock wave load will occur, it is required that any blast protection means in the ventilating and flue ducts operate without the necessity of any manual release or actuation.

If protection is required only against air shock waves resulting from the detonation of conventional high explosives, various measures heretofore developed and applied are available. These protective measures are based on the fact that air shock waves produced by the detonation of conventional high explosives, even heavy conventional bombs, have a very short duration (on the order of 15–20 milliseconds) for the overpressure phase. For this reason the shock wave largely acts as a transitory impulse and, even though it has a high overpressure, it may completely (or at least in part) be arrested or reflected by rather small masses interposed in the path of its principal direction of movement.

One method of protecting against shock waves from conventional weapons is by employing the so-called stone filters existing and used in Sweden since the 1940's. These stone filters consist of cobblestones having a diameter of 8–35 centimeters placed on or between grates, usually in layers about 1 meter thick. Ventilating air will pass through such a filter at a velocity of a few meters per second with only a reasonable drop in pressure. An air shock wave of short duration, however, even though it has a high overpressure, will have its main part reflected by the filter, and the part passing through the filter will be slowed by repeated reflections against various stones, weakening its destructive impulse effect.

As a rule, stone filters cannot be used for flue ducts as they are readily clogged by soot and other smoke particles. Therefore, in flute ducts, geometrical damping devices are generally utilized. In these devices, the incident air shock wave is partly intercepted by a plurality of separated shock wave pockets or shock wave funnels and reflected out through the inflow opening. In certain cases these devices are supplemented with through-blast ducts which cause the incident shock wave, to a great extent, to "blow past" the inner portion of the flue duct proper.

Sometimes these geometrical damping devices (shock wave pockets, shock wave funnels, and through-blast ducts or tunnels) are used alone or in various combinations outside or in advance of stone filters in order to reduce the shock wave load reaching these filters and thereby increase the total protective effect against short duration air shock waves.

In contrast to the short duration shock waves of conventional weapons, the duration of the overpressure phase of the air shock waves resulting from the detonation of nuclear weapons may vary from about 0.3 second for uranium weapons of the kiloton class up to 5 seconds for large megaton hydrogen weapons. Because of the long durations of the overpressure phases of shock waves produced by the detonations of nuclear weapons, neither stone filters nor geometrical damping devices of reasonable dimensions are suitable as protective means. Although the air shock wave is stopped momentarily by such devices, the pressure zone is so large that, almost immediately after the shock wave arrives, a continuous flow of air under high pressure will pass through the protective devices to the interior of the protected structure.

Various methods have heretofore been proposed, and employed, to provide protection against the long duration air shock waves resulting from nuclear weapon detonations. For example, sand filters have been developed for less qualified shelter spaces such as civilian air-raid shelters which are only intended to provide protection against overpressures of about one atmosphere. These filters are based on the same principle as the stone filters, but the particle size of the filter material is much smaller. As a consequence, the pressure drop through sand filters is very high and they cannot be employed for ventilating ducts where large quantities of air are required or for flue ducts.

Another arrangement, which has been resorted to primarily for increasing the protection of existing plants, consists of a pendulum gate arranged outside or in advance of a stone filter, and suspended in such a manner that the air shock wave will hit the gate frontally and close it against a fixed abutment. That portion of the air shock wave which has time to pass through the gate opening before it swings closed is then damped by the stone filter located inside. Because of space and strength requirements, however, these gates are rather heavy— especially when they are designed to withstand high blast loads—and, as a result, they have comparatively long closing times. In addition, the combined gate and stone filter protective construction is bulky and expensive.

The main object of the present invention is to provide more effective protection against air shock waves of both long and short duration than has heretobefore been possible. The invention is applicable to both ventilating air ducts and flue ducts and employs the incident shock wave to actuate a valve structure having a small mass which, therefore, closes very rapidly under shock wave influence and allows only a negligible portion of the incident shock wave to pass through the protected duct into the interior of the structure.

When protective devices of the type of which this invention is concerned are used in flue ducts, they will, of course, be subjected to concentrations of highly corrosive substances. Accordingly, these protective devices must be inspected and subjected to preventive maintenance at frequent intervals to insure their proper operation. Accordingly, it is a further object of this invention to provide duct-mounted devices for protecting against air shock waves of long and short duration in which the major structural elements may be readily removed to facilitate inspection and maintenance.

Other important objects of the preesnt invention include:

(1) The provision of protective devices which will operate automatically under the influence of shock load impact without the assistance of complicated mechanisms;

(2) The provision of protective devices which will close so rapidly that the fraction of an incident shock wave admitted to the interior of the structure during closing movement will be negligible;

(3) The provision of protective devices which will insulate the interior of a protected structure against both the overpressure and suction phases of a blast wave;

(4) The provision of protective devices which will withstand heavy blast loads having high overpressures;

(5) The provision of protective devices having fluid flow passages with minimal aerodynamic drag providing minimum impedance to normal air and flue gas flow; and (6) The provision of protective devices fabricated from materials able to withstand the highly corrosive substances normally found in flue ducts.

Other important objects and novel features of the present invention will become apparent from the appended claims and the ensuing detailed description and discussion taken in conjunction with the accompanying drawings, in which:

FIGURE 1 is a side elevation of a protective device constructed in accordance with the principles of the present invention;

FIGURE 2 is a longitudinal section of the protective valve device molded into a wall of reinforced concrete having a strength commensurate with the shock wave load for which the device is designed;

FIGURE 3 is a sectional view of the protective valve device with the valve member removed and is taken substantially along line 3—3 of FIGURE 2;

FIGURE 6 is a longitudinal section of another embodiment of a protective device constructed in accordance with the principles of the present invention and particularly useful in applications where it is desirable to install a number of protective devices in a single, comparatively large opening;

FIGURE 7 is a horizontal sectional view of a protected installation illustrating one method of installing and arranging the protective devices provided by the present invention;

FIGURE 8 is an elevational view of the installation of FIGURE 7 and is taken substantially along line 8—8 of that figure;

FIGURE 9 is a longitudinal section of an embodiment of the present invention equipped with an automatically operated mechanism for automatically locking the valve member in a closed position;

FIGURE 10 is an exploded perspective view of a further embodiment of the present invention having a dismountable construction facilitating ready removal of the major structural elements of the protective device from its installed location;

FIGURE 11 is a longitudinal section of the protective device illustrated in FIGURE 10;

FIGURE 12 is a plan view of the valve member employed in the embodiment illustrated in FIGURE 10, showing the condition of the disk after it has been actuated to closed position by shock wave impact;

*First Anti-Blast Valve Embodiment*

Figure 4:
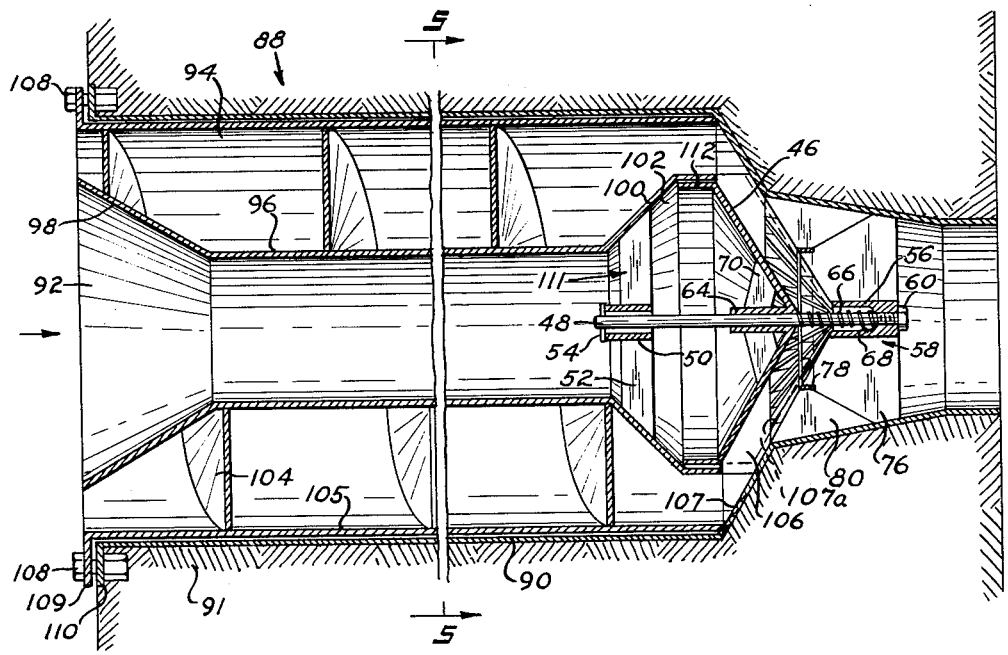
FIGURE 4 is a longitudinal section of an embodiment of the protective valve device which is adapted to close without admitting any shock wave pressure to the interior of the protected structure and includes a ventilating duct separated from and arranged helically around the inflow channel leading to the valve member.

Referring now to the drawings, FIGURE 1 illustrates a protective device (which for the sake of convenience, will hereinafter be termed an anti-blast valve) 20 constructed in accordance with the principles of the present invention. Anti-blast valve 20, which may be most beneficially employed in protecting structures from the destructive effects of nuclear explosion air shock waves without impeding the flow of ventilating air or flue gases to and from the structure at normal velocities, consists generally of a substantially cylindrical casing 21 providing an inflow channel 22 and a valve assembly 24 which will be described in detail presently. Inflow channel casing 21 is preferably, for convenience in assembling and installing the anti-blast valve, constructed from two independent, substantially cylindrical members 26 and 28 secured together by suitable fasteners (not illustrated). Disposed around the exterior of inflow channel casing members 26 and 28 are a plurality of reinforcing rods 30 which are attached to annular flanges 32 and 34 formed on the opposed ends of the inflow channel members by bolt-like fasteners 36. Reinforcing rods 30 are employed in installing the anti-blast valve in a concrete wall and prevent it from being displaced by air shock wave impact. The number or configuration of these rods is not critical and they may, in fact, be omitted if desired for a particular application.

A pair of lifting lugs 38, welded or secured in other appropriate manner to inflow channel casing members 26 and 28, facilitate the handling of the anti-blast valve. These lifting lugs may also be omitted if desired.

Referring now to FIGURE 2, inflow channel 22, which preferably has a length at least 1.5 times its width or diameter, will direct an air shock wave approaching in a direction indicated by the arrow along the longitudinal axis of the channel. Intermediate its ends, an enlarged space or chamber 40 is formed in inflow channel 22 by outwardly directed, annular flanges 42 and 44 formed on the abutting ends of inflow channel casing members 26 and 28, respectively. Coaxially mounted in the enlarged chamber 40 is the valve assembly 24, referred to above, which consists of a concave (inwardly dished) valve body 46, which preferably has a conical configuration, slidably mounted on a stationary, longitudinally extending shaft 48. The forward end of shaft 48 (the end extending into inflow channel casing member 26) is supported in a cylindrical sleeve 50 supported by radially extending ribs 52 from the casing member. The rear end of shaft 48 (the end extending into inflow channel casing member 28) is supported in a generally cylindrical sleeve 56 spaced from the walls of inflow channel member 28 by a grate 58 which will be described in detail presently. Shaft 48 is secured in place by a positioning pin 54 extending through shaft 48 and abutting the forward end of the cylindrical sleeve 50 and a nut 60 threaded on the rear end of the shaft and tightened against cylindrical sleeve 56.

Valve body 46 is maintained in the open position illustrated in FIGURE 2 by a coil spring 62 surrounding shaft 48 and extending between positioning pin 54 and the forward end of a cylindrical hub 64 of the valve body and by a coil spring 66 surrounding shaft 48 and extending between the rear end of the valve body and the inner end of an enlarged diameter portion 68 of the bore of the cylindrical sleeve 56 supported by grate 58.

When anti-blast valves 20 are employed in ventilating air ducts, valve bodies 46 are preferably fabricated from a light-weight aluminum alloy so that they may be moved as quickly as possible to closed position under air shock wave impact. The preferred material is an aluminum alloy designated 26 SO and produced by AB Aluminium-companiet, a Swedish aluminum producer.

Appropriately dimensioned circular plates of the aluminum alloy 26 SO are deformed to a conical configuration by any cold-working process. The conical valve bodies thus formed are then heated to a temperature of 510±3° C. When the valve bodies reach this temperature, they are taken out of the heating oven and, within 45 seconds, quenched in cold water. The valve body may then be further deformed to the final configuration. Such deformation, however, must be completed within eight hours from the time the valve bodies are removed from the heating oven.

Following final deformation to the desired configuration, the valve bodies are aged for ten hours at a temperature of 175±5° C. and then allowed to cool to room temperature. The resulting material has the highly important property that it will remain ductile even under the high dynamic loads imposed on it when it is impacted against the supporting grate 58 under air shock wave load.

Referring next to FIGURE 12, impact of the valve body 46 against the valve-supporting grate 58 forms ridges or corrugations in the valve body. These ridges impart additional strength to the valve body and enable it to successfully withstand further blast impacts, especially the sub-pressure phases.

When the anti-blast valve is employed in a flue gas duct, the aluminum alloy valve bodies described above are not satisfactory as they are rapidly corroded by substances normally present in flue gases. Therefore, in flue duct applications, valve bodies 46 are preferably fabricated from a ductile stainless steel. Specialized heat treatment, as described above in conjunction with the aluminum alloy valve bodies, is not necessary when stainless steel is employed. Although stainless steel valve bodies are heavier and, therefore, have a somewhat longer closing time than aluminum alloy bodies, the closing times of the stainless steel valve bodies are still well within acceptable limits and are much faster than the closing time of any comparable anti-blast valves heretofore employed. Radially extending ribs 70, extending between valve body 46 and hub 64, are preferably employed to add strength and rigidity to the valve body.

In the closed position shown by dotted lines in FIGURE 2 and indicated by reference character 72, the peripheral portion of valve body 46 abuts, and rests against, an outwardly extending portion 74 of the annular flange 44 formed on the forward end of inflow channel casing member 28 and the central portions of the valve body are supported by grate 58.

With reference now to FIGURES 2 and 3, grate 58 is formed from a plurality of thin, radially extending bars 76 connected at their inner edges to the cylindrical sleeve 56 and at their outer edges to inflow channel casing member 28. The forward edges of radially extending bars 76 are connected by a cylindrical ring 78 to rigidify and strengthen the assembled grate structure. Interposed between adjacent radial bars 76, and extending between annular ring 78 and the inner surface of inflow channel casing member 28 is a second series of thin radial bars 80 which provide needed additional support for the intermediate portions of valve body 46. Radial bars 76 and 80 may be connected to ring 78 and to sleeve 56 by welding or by any other method which will provide a strong rigid unitary structure. The outer edges of radial bars 76 and 80 are configured to provide a close sliding fit with the inner surface of inflow channel casing member 28 but need not be attached thereto so that the grate structure may be removed from casing member 28 if desired. It is a particular advantage of the above-described structure that it provides a strong, rigid valve-supporting grate able to withstand extremely high air shock wave impacts yet offers only minimal resistance to the normal flow of ventilating air through inflow channel 22 and the annular gap 82 between valve body 46 and the annular flange portion 74 at the forward end of inflow channel casing member 28 to the rear end of the inflow channel and into the protected structure (or in the opposite direction in the case of flue gases).

An incident air shock wave, however, entering and passing through inflow channel 22, will act with a directive effect on valve body 46; that is, the intensity of the shock wave will be the greatest at the center of the valve body and will decrease radially outward towards annular gap 82. Under the action of the incident air shock wave, the relatively light valve body 46 is accelerated to a great velocity and quickly reaches closed position. The pressure of the air shock wave retains valve body 46 against annular flange portion 74 and grate 58 during the prolonged overpressure phase of the shock wave.

Because valve body 46 has a concave shape and a width that is greater than the width of the initial portion of inflow channel 22, it will intercept the major portion of the incident shock wave during the valve closing period. This causes, on one hand, a concentrated load acting on the valve body to shorten its closing time and, on the other hand, a considerable reduction in the intensity of the shock wave passing through annular gap or opening 82 during the valve closing period.

Because of the unique combination of valve body and grate structure described above, the valve body will be capable of resisting high loads even though the valve body itself is made from comparatively thin and light material so that it will be readily displaced by air shock wave impact.

During the sub-pressure phase of the shock wave, the valve body is "sucked" outwards or forward to the position illustrated by the dot-dash line in FIGURE 2 and indicated by reference character 84. In this position, its peripheral edge 86 is sealed against the inner surface of the annular flange 42 formed on the rear end of inflow channel member 26, preventing any destructive sub-pressure effect inside the valve body or the protected structure. The concave, conical shape imparts sufficient strength and stability to the valve body to enable it to resist the action of the sub-pressure phase of the shock wave while retaining small mass and weight characteristics. In fact, the valve body acts as a single-curved or double-curved shell, a particularly advantageous form of valve member construction.

When the shock wave effect terminates, valve body 46 is returned to its initial open position by forces exerted by springs 62 and 68.

That comparatively negligible part of an incident air shock wave which is permitted to pass through anti-blast valve 20 may, if desired, be damped by a stone filter, damping chamber or other comparatively simple means to a level commensurate with the activity located inside the protected structure.

*Second Anti-Blast Valve Embodiment*

Figure 5:
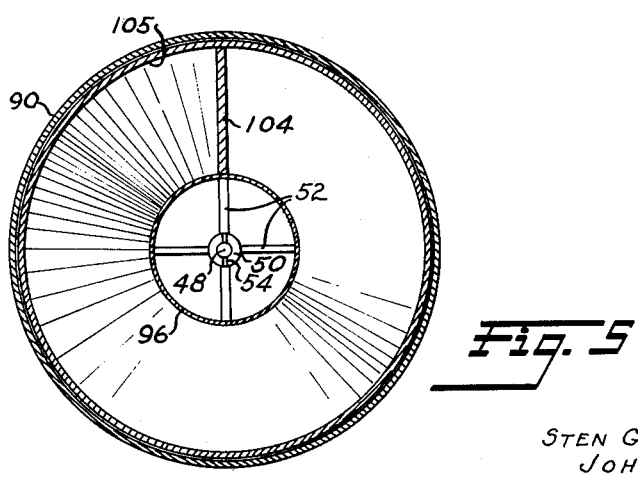
FIGURE 5 is a sectional view of the device of FIGURE 4 taken substantially along line 5—5 of that figure.

In particular applications, a requirement may exist that none of the shock wave enter the protected structure. An anti-blast valve 88, constructed in accordance with the principles of the present invention and arranged to attain this objective, is illustrated in FIGURES 4 and 5. Anti-blast valve 88 is, with the exceptions noted below, of the same general construction as anti-blast valve 20, and like reference characters have, therefore, been employed to indicate like parts.

Anti-blast valve 88 is housed in an elongated, generally cylindrical housing 90 installed in wall 91 of concrete or similar material. Anti-blast valve 88, unlike the previously described valve 20, has two separate and independent inflow channels 92 and 94. Inflow channel 92 is formed or defined by an elongated, generally cylindrical casing 96 centrally positioned in housing 90. A funnel-shaped flange 98 is formed on the shock wave-receiving forward end of inner casing 96 for guiding and directing the movement of an approaching air shock wave. An outwardly extending radial flange 100, formed on the rear end of inner casing 96, forms an enlarged chamber 102, similar to the enlarged chamber 40 described above in conjunction with the embodiment of FIGURES 1–3.

Inflow channel 94 has a helical configuration formed by one or more helical plates 104 connected by welding or in any other suitable manner between inner casing 96 and an outer valve casing 105 concentric with and disposed adjacent the inner surface of housing 90. In addition to forming helical inflow channel 94, helical plate (or plates) 104 supports and positions inner casing 96. Inflow channel 94 communicates with an annular gap or opening 106 formed between an annular rearwardly directed shoulder 107 formed intermediate the ends of housing 90 and valve body 46 in its open position and is the passage through which ventilating air or flue gases flow in normal operation.

The anti-blast valve 88 may be removed from or installed in housing 90 after the latter is permanently molded into wall 91 by removing the bolts 108 extending through flange 109 of outer casing 105 and flange 110 of housing 90. This permits removal of the structure forming the inflow channels 92 and 94, a valve assembly 111, and a grate 58.

Valve assembly 111 is identical to the valve assembly 24, described above, with the following exceptions: First, only a single valve positioning spring 66 is employed to return valve body 46 to the open position after an air shock wave passes for reasons which will become apparent as the description of this anti-blast valve embodiment proceeds. Secondly, a forwardly extending annular cylindrical flange 112 is formed on the periphery of valve body 46. Flange 112 cooperates with the flange 100 formed on the rear end of inner casing 96 to form the enlarged chamber 102.

An incident shock wave, travelling in the direction indicated by the arrow of FIGURE 4, will enter both of the inflow channels 92 and 94. The portion of the shock wave travelling through inflow channel 92 will be completely intercepted by valve body 46 which will be rapidly accelerated to its closed position against the inwardly directed annular shoulder 107 formed in housing 90 and the supporting surfaces of the radial bars 76 and 80 in grate 58. This position is shown in dotted lines in FIGURE 4 and is indicated by reference character 107a. The shock wave simultaneously entering inflow channel 94 reaches annular gap 106 after the shock wave entering inflow channel 92 reaches valve body 46 since it must travel the longer, helically shaped path. The ratio between the length of inflow channels 92 and 94 is adjusted so that valve 46 will close before the shock wave through channel 94 reaches annular gap 106 to prevent any of the shock wave from reaching the interior of the protected structure.

Although, in the embodiment illustrated in FIGURE 4, only a single helical inflow passage 94 is shown, it is to be understood that the present invention also contemplates the employment of a plurality of such passages. Plural passages may readily be formed by employing a plurality of helical plates 104.

*Third Anti-Blast Valve Embodiment*

Shock wave delay may also be effected in other ways. A system or arrangement for effecting such delay which is especially useful when the protection of comparatively large venting openings is required (i.e., where a plurality of anti-blast devices constructed according to the principles of the present invention are employed in a single opening) is illustrated in FIGURES 6–8. Again, like reference characters have been employed to indicate elements which are identical with corresponding elements in other embodiments.

The anti-blast valve 116 illustrated in FIGURE 6 is intended to be installed in a wall 117 of concrete or similar structural material having a relatively large cavity or chamber 118 between its outer and inner edge surfaces 120 and 122. A valve assembly 124, which is generally similar to the valve assemblies 24 and 110 described above, is attached by bolts 126 (or other suitable releaseable fasteners) to a cylindrical casing 128 which, in part, defines an inflow channel 130. The forward end of casing 128 communicates with the atmosphere through the forward portion of inflow channel 130 which is formed by a through aperture 132 extending from the forward wall 134 of cavity 118 to the exterior surface 120 of wall 117. Casing 128 is so located with respect to cavity 118 that, when valve body 46 is in its normal position, an annular gap or opening 135 will be provided between the valve body and the adjacent rear wall.

A valve body supporting grate 58 is mounted in a generally cylindrical casing 138 extending between the rear wall 136 of cavity 118 and the inner wall surface 122 of concrete wall 117 to support valve body 46 in its closed position.

The only substantial distinction between the valve assembly 24, described above, and valve assembly 124 is the manner in which the forward end of fixed, valve body mounting shaft 48 is supported in the latter. As in the previous embodiments, this end of the shaft is supported in a generally cylindrical sleeve 50 to which are attached radially extending support bars 52. In this particular embodiment the outer ends of these support bars are welded or fastened in any other appropriate manner to an annular ring 142 through which the bolts 126 extend to connect valve assembly 124 to casing 128. The configuration of the valve body 46 employed in this embodiment is identical to the configuration of the valve body 46 illustrated in FIGURE 4 and a detailed description of its configuration will, therefore, not be repeated here.

FIGURES 7 and 8 illustrate a battery of six anti-blast valves 116 installed in an opening in the concrete wall structure, indicated generally by reference character 143, extending between the exterior wall surface 120 and the interior wall surface 122. Each of the anti-blast valves is surrounded by a cavity 118 as described above. As is shown in these figures, each of the cavities 118 is connected to the atmosphere by two tortuous ventilating channels 144 formed in the concrete wall 117 and opening onto its exterior surface 120. The passages formed by ventilating channels 144, cavities 118, annular gaps 135, and the rearmost portions of inflow channels 130 constitute the paths along which the ventilating air or flue gases, as the case may be, normally flow (though in the reverse order for flue gases).

On the other hand, an air shock wave approaching the installation of FIGURE 7 in the direction indicated by the arrows will travel directly through inflow channels 130 to the valve bodies 46 which will, under the impact of the shock wave, move to the closed position shown in dotted lines in FIGURES 6 and 7 and indicated by reference character 146. At the same time, the air shock wave will enter ventilating channels 144 and be propagated along these to the communicating cavities 118 surrounding the anti-blast valves. The length of channels 144 are adjusted so that the air shock wave passing through inflow channels 130 will close anti-blast valves 116 before any part of the shock wave passing through channels 144 reaches the nearest annular valve gap 135 to prevent it from passing through the gap to the interior of the protected structure.

Delay or ventilating channels 144 may be arranged in many different ways. For example, they may be connected to cavities 118 but fashioned completely independent of the concrete wall structure.

*Fourth Anti-Blast Valve Embodiment*

Referring next to FIGURE 9, any of the anti-blast valve assemblies 24, 110 or 124, described above, may be provided with an arrangement for locking the valve body 46 in its closed position. This locking arrangement may be employed under either one of two circumstances. First, it may be employed to automatically lock the valve in its closed position when moved thereto by air shock wave impact. It may also be employed in the absence of an air shock wave impact to lock the valve body 46 closed. In the latter circumstance, the valve body 46 is manually pushed to its closed position where it will be automatically locked.

A locking device, which will operate in the manner described above, can of course be fashioned in many different ways. One embodiment, which is suitable for use with the anti-blast valve assemblies referred to above, is illustrated in FIGURE 9. The valve assembly 148 illustrated in this figure is identical with the valve assembly 24 illustrated in FIGURE 2 with the exceptions noted hereinbelow and, therefore, like reference characters have been employed to designate like parts. In addition, description of the elements of valve assembly 148 which would be merely repetitious have been omitted. It is to be understood that the locking device has been illustrated only in conjunction with a single embodiment, that of FIGURES 1-3, for the sake of convenience and that it may equally well be employed with the valve assemblies 110 and 124 illustrated in FIGURES 4 and 6, respectively, or variations thereof.

With continued reference to FIGURE 9, a locking pin 150 is slidably mounted in a transversely extending aperture 152 fashioned in fixed, valve body-supporting shaft 48 adjacent its forward end. The inner end of pin 150 terminates in an enlarged diameter cylindrical head 154 disposed in a cylindrical recess 156 in shaft 48 communicating with the transversely extending aperture 152. The outer end of recess 156 is closed by a plate 158 secured to shaft 48 by screws 160. Plate 158 is disposed in a recess 162 extending between the outer end of recess 156 and the outer surface of shaft 48 and so dimensioned that plate 158 will be flush with the outer surface of the shaft.

Arranged between head 154 of pin 150 and the inner surface of plate 158 is a spring 164 which biases pin 150 into engagement with the inner surface 166 of the valve body hub 64.

When valve body 46 is moved manually, or under air shock wave impact, to the closed position shown in dotted lines and indicated by reference character 168, the forward edge 170 of valve hub 64 will move rearwardly beyond pin 150. As hub 170 moves beyond the pin, spring 164 will force the pin outwardly until its head 154 abuts the inner end 172 of the head-receiving recess 156. In this position, pin 150 will extend outwardly beyond hub 64, preventing the valve body 46 from moving forwardly.

Other locking devices may be employed if desired without exceeding the scope of the present invention. For example, the locking pin 150 described above may be operatively connected to an electromagnet operated automatically after a predetermined elapsed time or by a manually triggered impulse to withdraw the pin to the position illustrated in FIGURE 9 so that spring 66 may return the valve body 46 to its open position. Similarly, locking devices may be employed to lock the valve body 46 in its closed position during both the overpressure and subpressure phases of an air shock wave and to automatically release the valve body when the subpressure phase terminates so that the valve positioning spring 66 can return the valve body to the open position.

Other minor structural differences between valve assembly 148 and valve assembly 24 will also be noted. For example, in valve assembly 148, valve body supporting shaft 48 is secured in shaft-supporting sleeve 56 by an annular weldment 172. And, because locking pin 150 is intended to lock valve body 46 in closed position 168 during both the overpressure and subpressure phases of an air shock wave, valve body 46 will not move forwardly to a second closed position such as that illustrated at 84 in FIGURE 2. Therefore, valve body-supporting shaft 48 has been shortened and the structure illustrated in FIGURE 2 for supporting its forward end has been omitted. The foregoing changes are examplary of those which may be made to adapt anti-blast valves constructed in accordance with the present invention to particular applications and are thus illustrative of the broad scope of the present invention.

*Fifth Anti-Blast Valve Embodiment*

As was indicated above, it is desirable, when an anti-blast valve constructed in accordance with the principles of the present invention is used in a flue gas duct, to be able to readily remove the major elements of the valve for inspection and maintenance because the highly corrosive substances normally found in flue gases require that such inspection and maintenance be performed at frequent intervals. A dismountable anti-blast valve 174, constructed in a manner calculated to achieve this objective, is illustrative in FIGURES 10 and 11.

The major operating components of anti-blast valve 174, which will be described in detail presently, are housed in an elongated, cylindrical outer housing or casing 176. As is shown in FIGURE 11, housing 176 is molded and, therefore, permanently mounted, in the concrete or similar wall 178 of the protected structure.

Mounted in outer casing 176 are an inflow channel assembly 180, an expansion chamber assembly 182, a valve assembly 184, and a grate-type valve body supporting assembly 186. A cylindrical inner casing 188, extending between expansion chamber assembly 182 and valve body support assembly 186, completes the configuration of the valve.

Inflow channel assembly 180 includes an elongated cylindrical casing 190 defining an inflow channel 192 which serves the same purpose as the inflow channel 22, described above. Welded or otherwise attached to casing 190 intermediate its ends is an annular, outwardly extending mounting flange 193. Bolts 194, extending through apertures 196 in mounting flange 193 and aligned apertures 198 in an outwardly extending annular flange 200 welded to the front end of housing 176 into nut-like fasteners 202 welded to housing 176 and flange 200, removably secure the inflow channel assembly in place.

Welded or otherwise fixed to the rear end of casing 190 is an outwardly directed annular flange 204 to which is attached the expansion chamber assembly 182, which will be described in detail presently. Longitudinally extending, radially outwardly directed stiffeners or ribs 206 extend between radial mounting flanges 193 and 204 to strengthen and add rigidity to the inflow channel assembly.

Attached by welding, or in any other appropriate manner, to the forward end of casing 190 is a third outwardly directed, annular mounting flange 208. Flange 208 is adapted to support a cover (not illustrated) to seal off inflow channel 192 which may be attached to flange 208 by suitable releaseable fasteners (not illustrated) extending through apertures 210 in the flange.

Expansion chamber assembly 182 consists of a conical, funnel-like member 212 to the front end of which is welded an annular, outwardly extending mounting plate 214 having a central aperture 215 coextensive with the opening in the forward end of member 212. Conical member 212, together with the inflow channel defining casing 190, guide and direct an air shock wave entering the inflow channel 192 so that it will exert the most effective closing impact on valve body 46.

A plurality of longitudinally extending, radial directed stiffening plates 216 are connected between conical member 212 and mounting plate 214 to strengthen the assembly which is further strengthened by an annular ring 218 connected in any suitable manner to the forward portions of the outer edges of stiffening plates 216 and to the rear side of annular mounting plate 214. Expansion chamber assembly 182 is removably connected to the rear end of inflow channel assembly 180 by a plurality of bolts 220 extending through aligned apertures 222 and 223 in mounting plate 204 of inflow channel assembly 180 and mounting plate 214 of expansion chamber assembly 182, respectively, and secured in place by nuts 224. An annular metallic ring 225, disposed between mounting plates 204 and 214 serves as a gasket and provides a continuous flow path between assemblies 180 and 182.

Expansion chamber assembly 182 also includes a valve shaft-supporting sleeve 226 centrally supported by four radially extending support bars 228 connected at their inner ends to the sleeve and, at their outer ends, to mounting flange 214 and conical member 212.

Valve body supporting assembly 186 includes a rearwardly and inwardly tapered casing 230 in which is permanently assembled a grate 232 similar to the grate 58, described above. Grate 232 includes a plurality of radially extending, valve body-supporting ribs 234 connected, at their outer ends, to the inner surface of tapered casing 230 and, at their inner ends, to a valve shaft-supporting sleeve 236. An annular ring 238 is welded or otherwise secured in slots 240 formed in the forward edges of support bars 234 to add strength and rigidity to the grate structure.

Connected between annular ring 238 and the inner surface of tapered casing 230 between adjacent support members 234 is a second series of radially extending support bars 242 (see FIGURE 10). As did the corresponding support bars 80 in the embodiment of FIGURE 2, support bars 242 lend increased support to the intermediate portions of the valve body when it is in the closed position.

Welded or otherwise attached to the front end of tapered casing 230 is an outwardly and forwardly directed annular conical flange 244 having the same taper as valve body 46 and, in effect, forming an extension of grate bars 234 and 242. When the valve body is in a closed position, annular flange 244 supports its peripheral edges in the same manner as the annular flange portions 74 of inflow casing member 28 support the corresponding valve body in the embodiment illustrated in FIGURE 2.

Surrounding the rear or inner end of tapered casing 230 is an outwardly directed, annular flange 246 which may be attached to the casing in any desired manner. Welded to flange 246 and the outer surface of tapered casing 230 in abutting relationship to the forward side of flange 246 is an annular, radially outwardly extending, positioning plate 248. A plurality of longitudinally extending, radially directed ribs 250 are connected to plate 248, the outer surface of casing 230, and the valve body supporting flange 244 to add strength and rigidity to assembly 186. An annular ring 252 surrounds and is connected to the outer edges of each of the stiffening members 250 adjacent the rear ends thereof to further strengthen the assembly.

Valve supporting assembly 186 is maintained in the proper position in permanently installed housing 176 by an annular ring 254 welded to centrally apertured circular plate 256 which forms the rear end wall of the housing and abuts the positioning plate 248 of the assembly. Housing 176 is completed by a cylindrical casing 258, welded, at its forward end, in the aperture 260 in housing end plate 256 and extending to the interior surface of concrete wall 178. The rear or inner end of cylindrical casing 258 supports an annular, outwardly directed plate 262 to which an annular flange member 264 is attached, flush with the interior surface of concrete wall 178, by bolts 266.

Valve assembly 184, as is best shown in FIGURE 11, is in most respects identical to the valve assemblies 24, 110, and 124, described above. Like reference characters have, therefore, been employed to designate valve assembly elements which are identical to the corresponding elements in the valve assemblies described above.

Referring now specifically to the valve assembly 184 illustrated in FIGURE 11, the valve body strengthening rib 70 employed in the valve assembly illustrated in FIGURE 2 has been omitted and, the valve body 46 and hub 64 are formed as separate elements. In this embodiment, valve body 46 is secured by welding, brazing, or soldering between an outwardly directed annular flange 267 formed on the rear end of the separated hub 64 and a dish-shaped valve strengthening and supporting member 268 surrounding the hub and having an outwardly directed, annular flange 270 clamping valve body 46 against flange 267. The foregoing elements, are, of course, displaceable as a single unitary assembly along valve supporting shaft 48.

A further feature of the illustrated embodiment is a shear pin 272 of any suitable, preferably soft metal which extends through aligned apertures 274 in valve hub 64 and 276 in the valve supporting shaft 48. It has been found, that when valve body 46 is maintained in the open position solely by the helical springs 62 and 68, normal flow of ventilating air and flue gases may tend to displace the valve body on its supporting shaft 48. To eliminate the flow variations caused by this movement of the valve body and thereby provide more efficient air or flue gas flow, pin 272 is employed to maintain the valve body in the desired open position. Under blast wave impact, however, pin 272 will be readily sheared and the valve will then move to its closed position. Replacement of pin 272 is facilitated by the dismountable arrangement of this embodiment. A like shear pin may of course be employed with the valve assemblies illustrated in FIGURES 1–9.

A further important feature of the embodiment illustrated in FIGURE 11 is the novel arrangement for supporting the forward end of valve body-supporting shaft 48. To provide maximum cushioning of the supporting shaft 48 under air shock wave impact and thereby prevent distortion of the shaft with consequent improper seating of valve body 46, a plurality of serially arranged Belleville springs 278 are journalled on a reduced diameter, forward end portion 280 of the shaft. The Belleville springs extend between a plate 282 around shaft 48 and the inner end wall 284 of a rearwardly directed recess 286 formed in the valve-supporting sleeve 226 concentric with its bore 287.

The valve body 46 illustrated in FIGURES 10 and 11 operates in the same manner as the corresponding valve body illustrated in FIGURE 2. That is, under blast or air shock wave impact, it moves to the position illustrated in dotted lines in FIGURE 11 and indicated by reference character 288. Blast wave overpressure will retain it in this closed position during the overpressure phase of the air shock wave. As in the anti-blast valve embodiment of FIGURE 2, the valve body 46 will be supported in the closed position by the supporting members 234 and 242 of grate 232 and by the conical flange member 244. By using this novel and effective grate arrangement, there may be employed a valve body which has very small mass and which may, therefore, be rapidly moved to closed position.

Subsequently, during the subpressure phase of the air shock wave, valve body 46 is "sucked" forward to the position shown in "dash-dot" lines and indicated by reference character 290 with its peripheral edge 86 in sealing relationship with the inner surface of the conical, funnel-like member 212 of expansion chamber assembly 182. After the air shock wave passes, springs 62 and 68 will return the valve body to its open position.

In the normal open position, there will be an annular gap 291 between valve body and valve body supporting assembly 186. This allows ventilating air to flow through inflow channel casing 190, expansion chamber assembly 182, casing 188, gap 291, grate structure 232, and housing 258 into the interior of the protected structure (or in the reverse direction for flue gas flow).

As was pointed out above, this embodiment is particularly useful in flue duct applications where concentrations of highly corrosive substances may be present. An effective corrosion inhibiting coating may be provided on flue duct employed valves by sequentially degreasing them, spraying their exposed surfaces with zinc to a depth of 0.002 inch and aluminum to a depth of 0.006 inch, and then coating them with an acrylic plastic.

For ventilating ducts, the valves may be treated by degreasing, sand blasting, and spraying with Condulite to a thickness of 0.008 inch. Any of the valves illustrated in FIGURES 1–9 may of course be treated in the same manner as the instant embodiment.

It may be desirable in certain applications to protect a structure against higher overpressure than would be possible with the employment of a single aluminum alloy valve body 46. Under such circumstances, two, or even three, such valve bodies disposed in the stacked relationship illustrated in FIGURE 10 may be employed.

Anti-Blast Valve Installations

Figure 13:
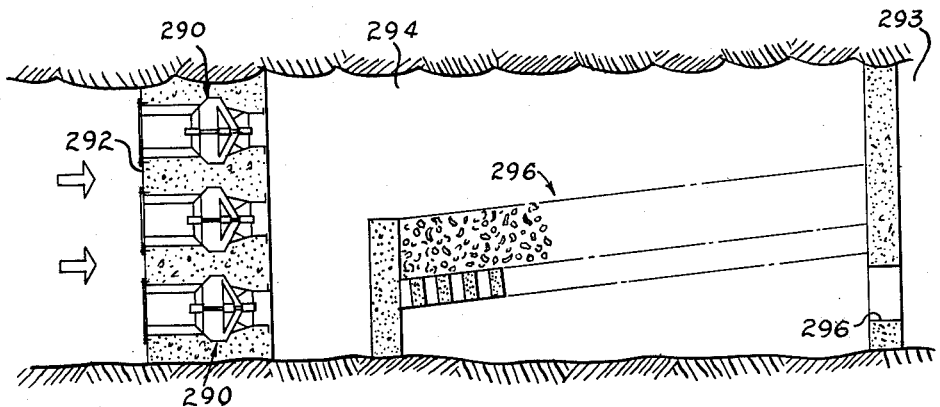
FIGURE 13 is a vertical sectional view of an installation employing the protective devices of the present invention in conjunction with a stone filter.
Figure 14:
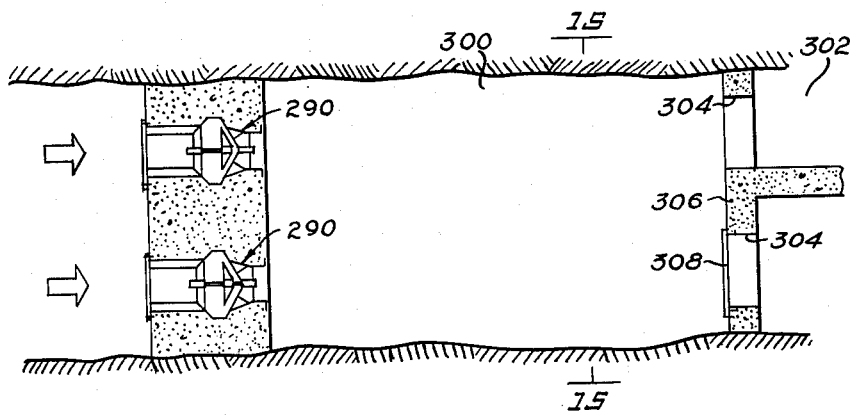
FIGURE 14 is a vertical sectional view of an installation employing the protective devices of the present invention in conjunction with a damping chamber.

Anti-blast valves, constructed in accordance with the principles of the present invention and employing lightweight aluminum alloy valve bodies of the type described above, normally have closing times on the order of 0.002 second. During this short duration closing period, a negligible portion of the air shock wave may pass through the anti-blast valve into the interior of the protected structure. Normally, this portion will be insignificant and may be disregarded. However, in particular applications such as where a delicate instrument is located within the protected shelter, it may be deemed desirable to dampen out even this minor portion of the air shock wave. One suitable arrangement for this purpose is illustrated in FIGURE 13.

In the illustrated arrangement, a plurality of anti-blast valves 290, which may be of any of the various types 20 or 174 described above, are molded into a concrete wall 292 constructed across the front of the structure 293 to be protected, for example a tunnel or cave. Disposed immediately behind wall 292 in a chamber 294 is a stone filter 296 of conventional construction. As was pointed out above, a stone filter includes one or more layers of stones which are effective to filter out shock waves of short duration but which will not seriously impede the flow of normal ventilating air or flue gases. Since the portion of the shock wave escaping through the closing valve has only a short duration, it will be effectively dampened out by the stone filter. The chamber 294 in which stone filter 296 is located may be communicated with the interior of the structure 293 through suitable opening or plurality of openings 298.

Figure 15:
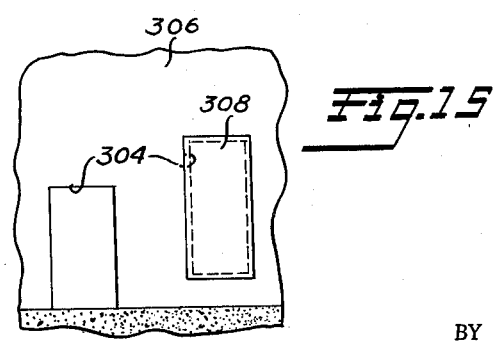
FIGURE 15 is an elevational view of the installation of FIGURE 14 and is taken substantially along line 15—15 of that figure.

Another arrangement for effectively damping the portion of the air shock wave passing through the anti-blast valve is illustrated in FIGURE 15. In this arrangement, that portion of the air shock wave which escapes through the closing anti-blast valves 290 passes into a damping chamber 300. Preferably damping chamber 300 has a minimum length $$L = 35 \times n \times A_v + 7 \text{ (ft.)}$$

where $n$ = number of anti-blast valves
$A$ = free valve area $(\pi D^2/4)$
$D$ = diameter of the anti-blast valves
$B$ = width of damping chamber
$H$ = height of damping chamber The damping chamber 300 may be communicated with the interior 302 of the shelter to be protected by an aperture 304 in the concrete wall 306 at the inner end of the damping chamber. Suitable shields 308 may be employed, if desired, to close off one or more of these openings to control flue gas or ventilating air flow.

Damping chambers are used only when the rooms of the protected structure have walls of reinforced concrete or steel and contain relatively robust installations and are not suitable for use with personnel shelters.

It is preferred, when anti-blast valves constructed in accordance with the principles of the present invention are employed to protect flue gas ducts, that a blast relief shield be installed in the duct. The blast shield will be ruptured by the impacting air shock wave which may then be led into a small damping chamber if desired.

It is to be understood that the foregoing arrangements do not exhaust the possibilities for damping the portions of the air shock waves passing through the closing anti-blast valves. As a further typical example, two anti-blast valves may be serially arranged in a single duct. The second of the valves will effectively interrupt that portion of the air shock wave passing through the first valve in its closing movement.

Any of the above-described anti-blast valves and anti-blast valve installations may be supplemented with warning and/or valve body releasing or closing devices placed at a suitable distance outside the protected structure. These devices may be arranged to activate a valve closing mechanism in response to a flash of light, air shock wave, or heat wave from a detonating charge so that the valve will already be closed when the air shock wave impacts upon it.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Means for protecting air ventilating and flue gas channels against air shock waves, comprising, in combination:
   (a) means defining a rectilinear inflow channel for receiving shock waves entering at one end of said inflow channel, said end being open to the atmosphere;
   (b) means providing an enlarged chamber in said inflow channel remote from said inflow channel one end and including means forming a valve seat at the end of said chamber remote from said inflow channel one end;
   (c) a concave-convex valve body located in said enlarged chamber with its concave face facing said inflow channel one end;
   (d) means mounting said valve member for axial movement in said chamber toward and away from said seat;
   (e) spring means for maintaining said valve body in normal ventilating position in axially spaced relation to said valve seat forming means;
   (f) said valve seat forming means having a sealing shoulder for engaging said valve body when said valve body is in its closed sealing position;
   (g) said inflow channel being arranged and disposed relative to said valve body to impart an incident shock wave entering said inflow channel one end a directive effect toward the center of said valve body to displace it to its closed position under the action of the shock wave;
   (h) said valve seat forming means including a rigid, apertured valve supporting grate means of concave form complementary to the convex surface of said valve body for supporting said valve body in its closed position.

2. Means according to claim 1, wherein said valve body mounting means includes a stationary shaft mounted in said enlarged chamber.

3. Means according to claim 1, wherein the cross sections of said enlarged chamber and said valve body normal to said inflow channel are greater than the cross section of said inflow channel, whereby said valve body will move outward in said chamber towards said inflow channel one end to engage the walls of said chamber at its end adjacent said inflow channel one end in a second sealing position under the action of a sub-pressure phase of the air shock wave, the walls of said enlarged chamber at its end adjacent said inflow channel one end having means defining a second valve seat cooperating with the periphery of said valve body.

4. Means according to claim 1, including means for locking said valve body in its closed position.

5. Means according to claim 1, wherein said valve supporting grate means comprises comparatively closely placed supporting bars to impart increased strength to the valve body in its closed position.

6. Means according to claim 1, wherein said valve body comprises an outwardly concave valve disc.

7. Means according to claim 6, wherein the valve disc has a conical shape.

8. In combination:
 (a) means defining a first fluid outlet passage and terminating in a first valve seat;
 (b) means defining a second fluid inlet passage open at one end and terminating at its other end in a second valve seat disposed in spaced apart opposed relation to said first valve seat said first and second valve seats being positioned so as to be sealingly engageable by a single valve member movable in a rectilinear path therebetween;
 (c) a valve member interposed between said valve seats and mounted for movement between alternative limit positions adjacent said seats;
 (d) means biasing said valve member toward a normal position adjacent but spaced from said second seat;
 (e) means defining a third passage of greater effective length than said second passage, said third passage having an opening at one end adjacent the open end of said second passage remote from the second valve seat and terminating at its other end at said first valve seat at the side thereof opposite said first passage, whereby, so long as said valve member is in its normal position, said first and third passages are connected for fluid communication and a shock wave directed into the open ends of the second and third passages will cause movement of said valve member toward said first valve seat before such shock wave reaches said first valve seat through said third passage.

9. Means according to claim 8, wherein said third passage is separated, disposed outside of, and is longer than said second passage so that an air shock wave entering said second and third passages simultaneously will close said valve body before the air shock wave reaches said first passage through said third passage.

10. Means according to claim 9 wherein said third passage is formed as a helix about said inflow channel.

11. Means for protecting and closing air ventilating and flue gas channels for air shelters and the like against entering air shock waves, comprising, in combination:
 (a) means defining a ventilating conduit and an inflow channel for receiving and directing the shock waves;
 (b) means providing an enlarged chamber in said ventilating conduit;
 (c) a concave valve body centrally and slidably mounted on a fixed shaft in said enlarged chamber;
 (d) spring means for normally maintaining said valve body in an open position;
 (e) means for displacing said valve body from said open position to at least one end position on said shaft for closing said ventilating conduit;
 (f) said enlarged chamber at the inflow side of said ventilating conduit being provided with an inner conical wall member forming a seat for the rim of the concave valve body in an inner closing position;
 (g) the concave side of said valve body facing toward the inflow side of said ventilating conduit;
 (h) a concave grate rigidly mounted in the ventilating conduit and forming a continuating of the inner conical wall member of said chamber, the central part of said valve body in said inner closing position resting on said grate;
 (i) the angle between the sides of the conical valve body being arranged to reflect an incoming pressure wave toward the center of the valve body.

12. Means for protecting and closing air ventilating and flue gas channels for air shelters and the like against entering shock waves, comprising, in combination:
 (a) means defining a ventilating conduit and an inflow channel for receiving and directing the shock waves;
 (b) means providing an enlarged chamber in said ventilating conduit;
 (c) a concave valve body centrally and slidably mounted on a fixed shaft in said enlarged chamber;
 (d) spring means for normally maintaining said valve body in an open position, said valve body being displaceable from said open position to at least one end position on said shaft for closing said ventilating conduit;
 (e) said enlarged chamber at the inflow side of said ventilating conduit being provided with an inner conical wall member forming a seat for the rim of the concave valve body in an inner closing position;
 (f) the concave side of said valve body facing toward the inflow side of said ventilating conduit;
 (g) said inflow channel comprising a pair of conduits of different lengths and distinct from said ventilating conduit, the first and longer of said pair of conduits serving as a ventilating and flow delaying conduit and forming a curved flow path to said valve body;
 (h) the second and shorter of said pair of conduits serving as an inflow conduit opening directly to the atmosphere substantially at a right angle to said valve body for receiving and directing an incoming pressure wave toward the valve body;
 (i) a circular flange provided on the rim of said valve body and extending from the conical side of said valve body;
 (j) the inner end of said second conduit opening into said first conduit and encircling said circular flange;
 (k) the inner end of said second conduit being spaced from the inner end of said first conduit to form a gap between said conduits at the inner ends thereof;
 (l) said flange having a height approximately corresponding to the opening gap between said second and first conduits to close said gap in an inner closing position of said valve body;
 (m) a concave grate rigidly mounted in the ventilating conduit and forming a continuation of said conical wall member of said enlarged chamber, the central part of said valve body in said inner closing position resting on said concave grate; and
 (n) the angle between the sides of the conical valve body being arranged to reflect an incoming pressure wave toward the center of the valve body.

13. Means for protecting and closing air ventilating and flue gas channels for air shelters and the like against entering shock waves, comprising, in combination:
 (a) means defining a ventilating conduit and an inflow channel for receiving and directing the shock waves;
 (b) means providing an enlarged chamber in said ventilating conduit;
 (c) a concave valve body centrally and slidably mounted on a fixed shaft in said enlarged chamber;

(d) spring means for normally maintaining said valve body in an open position, said valve body being displaceable from said open position to at least one end position on said shaft for closing said ventilating conduit;

(e) said enlarged chamber at the inflow side of said ventilating conduit being provided with an inner conical wall member forming a seat for the rim of the concave valve body in an inner closing position;

(f) the concave side of said valve body facing toward the inflow side of said inflow channel; and (g) the length of said inflow channel being at least 1.5 times its width or diameter, respectively.

14. Means for protecting and closing air ventilating and flue gas channels for air shelters and the like against entering air shock waves, comprising, in combination:

(a) first and second independently formed means including coaxial casings providing, respectively, a ventilating conduit and an inflow channel for receiving and directing the shock waves;

(b) releasable fastening means detachably connecting said casings;

(c) means providing an enlarged chamber in said ventilating conduit;

(d) a concave valve body centrally and slidably mounted on a fixed shaft in said enlarged chamber;

(e) means normally maintaining said valve body in an open position;

(f) said valve body being displaceable from said open position to at least one end position on said shaft for closing said ventilating conduit;

(g) means at the inflow side of said enlarged chamber having a conical wall member forming a seat for the rim of said concave valve body in an inner closing position;

(h) the concave side of said valve body facing the inflow side of said enlarged chamber and said enlarged chamber communicating through said inflow channel with the atmosphere.

15. Means according to claim 14, wherein:

(a) said concave valve body includes a hub surrounding said fixed shaft; and (b) said means for manually maintaining said valve body in the open position includes a shear pin extending through said hub and said shaft.

16. Means according to claim 14, including means operatively connected between the means having said conical wall member and said fixed shaft for cushioning said shaft as said valve body is moved to a closing position.

17. Means according to claim 16, wherein said cushioning means includes a plurality of Belleville springs mounted seriatim.

18. Means according to claim 14, wherein said valve body comprises a single valve disc of corrosion resistant metal.

19. Means according to claim 14, wherein said valve body comprises a plurality of lightweight discs in stacked relationship.

20. Means according to claim 19, wherein said discs are fabricated from a ductile aluminum alloy.

21. Means for protecting and closing air ventilating and flue gas channels for air shelters and the like against entering shock waves, comprising, in combination:

(a) means including coaxial casings defining a ventilating conduit and an inflow channel for receiving and directing the shock waves;

(b) means providing a chamber in said ventilating conduit;

(c) a concave valve body centrally and slidably mounted on a fixed shaft in said chamber;

(d) spring means for normally maintaining said valve body in an open position, said valve body being displaceable from said open position to at least one end position on said shaft for closing said ventilating conduit; and (e) said chamber at the inflow side of said ventilating conduit being provided with an inner conical wall member forming a seat for the rim of the concave valve body in an inner closing position, the concave side of said valve body facing toward the inflow side of said inflow channel.

References Cited in the file of this patent
UNITED STATES PATENTS
2,022,143    Mottershall _____ Nov. 26, 1935